Patented July 10, 1923.

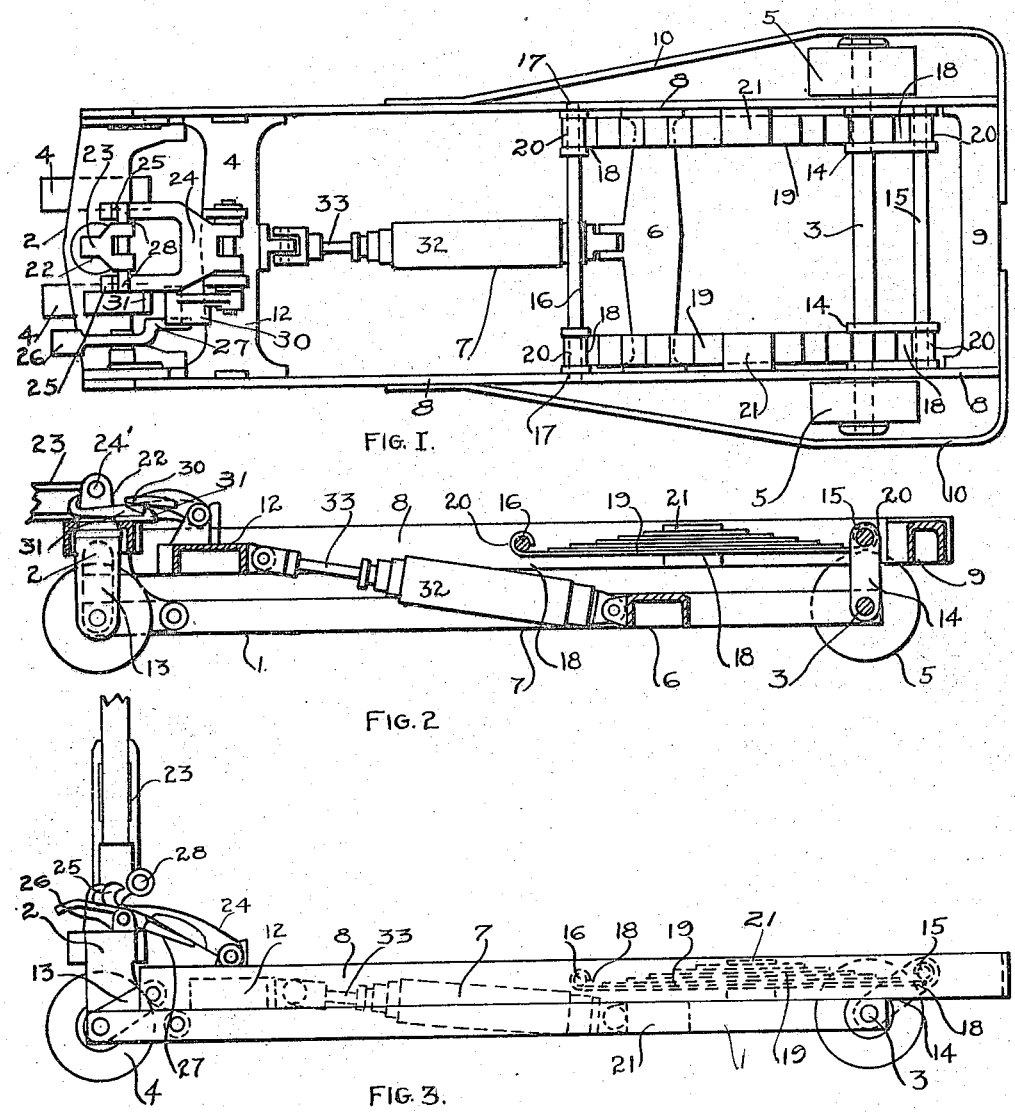

1,461,688

UNITED STATES PATENT OFFICE.

WILLIAM STUEBING, JR., OF CINCINNATI, OHIO.

LIFTING TRUCK.

Application filed December 24, 1919. Serial No. 347,181.

*To all whom it may concern:*

Be it known that I, WILLIAM STUEBING, Jr., a citizen of the United States, residing at the city of Cincinnati, in the county of Hamilton and State of Ohio, have invented certain new and useful Improvements in Lifting Trucks, of which the following is a specification.

My invention belongs to that class of lifting trucks composed of a wheeled base frame and a lifting frame or elevated platform mounted thereon, which carries the load, and which is raised or elevated by powerful mechanical devices employed to lift the load to be carried; supplementary platforms on which the goods have been previously loaded or placed in course of manufacture, are used enabling the operator to quickly load or unload the truck and readily move it from place to place, loaded or unloaded, through the agency of a steering handle.

Trucks of this class often carry tons of material in weight and consequently they bear very heavily upon the floor, and in passing over undulated surfaces of the floor or striking obstacles or raised places on the floor, the jar and impact is beyond normal travel; thus to a degree the high efficiency of the truck is impaired, the wear and tear is multiplied, damage to the floor is placed at a maximum, and the goods to be handled are often of such a character that they are injured, broken, or impaired in value. The object of my invention is to overcome these objections and produce a truck which can be used under the objectionable floor conditions just set forth and still retain a high degree of efficiency, and operate to all intents and purposes as if said truck were operating on a practically smooth floor.

The salient features of my invention consists in providing spring means in connection with the lifting or elevating platform of the truck, so that when the lifting platform is carrying a load, it will be suspended on said springs and be carried thereby, thus the elevating platform will act as a cushion and possess a degree of resiliency which will prevent jarring of the load and the impact on the floor will be cut to a minimum, thus enabling the truck to be used on rough floors, cobble stone pavements, rough cement floors, floors having an undulated surface and the like, and also enable the truck to be used in places where it is now practically impossible to employ such trucks with the proper degree of utility and efficiency. While I have invented a number of trucks of this character, to which my improvements can be applied, the preferred form is shown in my United States Patents No. 1,257,650, issued Feb. 26, 1918, and No. 1,381,515, issued June 14, 1921.

In the accompanying drawing, forming a part of this specification:

Fig. 1, is a plan view of a lifting truck, embodying my invention; Fig. 2, is a side elevation of the same, parts in section and broken away, the elevating platform being up, and Fig. 3, is a side view of truck shown in Fig. 2, the elevating platform being in lowered position, the steering handle partly broken away.

The lower frame of the truck is composed of side pieces 1, connected at front end to the head 2 of the truck, and at the rear end to the axle 3. This lower frame is supported at front on wheels 4 and at the rear on wheels 5. A tie bar 6 spans the lower frame rails 1 and carries and supports the rear end of the checking device 7.

The upper or elevating frame is composed of side rails 8, united at rear by a tie bar 9 and provided with side wings 10, a tie bar 12 also spanning the top rails 8, for strength and to support the forward end of the checking device 7. The upper frame and lower frame are connected together and the upper frame is movably supported on the lower frame by means including pivoted forward links 13 and pivoted rear links 14. A small shaft 15 connects the links 14 together.

The rear links 14 are mounted on the rear shaft 3. A small shaft or bar 16 extends between the rails 8 of the upper frame at points 17 (see Fig. 1). Suitably mounted on the upper frame, I provide a plurality of flat springs 18, each formed of a multiplicity of leaves 19. The ends of the flat springs 18, are curled around the small shafts 15 and 16 and held thereon at points 20. Any number of leaves may be used in forming each spring. At the middle or center of the springs, I attach, on each side of upper frame rails 8, a projection, bracket or arm 21, which arms impinge against or are connected to the springs intermediate the ends of the same.

At the forward end of the lower frame, in the head 2, I place a swivel 22 on the top of which I pivot at 24' the steering handle 23 so that the handle can be moved forward and backward.

On the upper platform at its forward end I connected a pivoted link 24; this link is raised by the treadle 26 which has a forward finger 27; which lifts the link 24 when the treadle 26 is stepped upon and the hooks 25 of the link 24 engage the pins 28 in the handle 23, thus, when the handle 24 is depressed or pulled down the elevating platform moves forward and upwardly until the hook 30 on the elevating platform engages hook 31 on the head 2 of the truck, this holds the elevating platform in an upper locked position (see Fig. 2); by raising the handle the pins thereon leave the hook 25 of link 24 and the link drops out of position (into a normal position). By stepping on treadle 26, the hooks 30 and 31 are disengaged and the platform descends, its rapid descent being interrupted and regulated by the checking device 7, which is a fluid check device formed of a cylinder 32 and a piston rod 33, the piston moving forward and backward in the cylinder 32. This checking device is common to trucks of this character and need not be further described.

It can readily be seen and understood, that when the upper frame or lifting platform is pulled forward and upward, the links 14 will elevate the springs, and through means of said arms 21, said springs will elevate the upper frame to a raised locked position. When the elevating platform is in this position it can readily be seen that a resilient action is produced upon the upper or elevating frame; thus the weight placed on the elevating platform will be suspended on springs and a cushion effect will result and all jars and ups and downs of travel of the truck will be absorbed by the resilient platform and the objections above set forth eliminated.

The truck will also travel easier, and more readily, and the operator is enabled to manipulate the same with greater efficiency and convenience.

When a lifting truck heavily loaded passes over an obstruction in a factory it pounds the floor and racks the truck terribly; if said truck however is equipped as herein shown with a resilient frame, it acts the same as if passing over a level floor, as the shock is absorbed.

I do not wish to limit myself to any particular form of spring in carrying out my invention in practice. I may use this form of suspended or resilient platform construction in connection with any form of truck, and may connect the same to a truck in any other manner than herein specifically shown and described.

What I claim as new and my invention and desire to secure by Letters Patent is:

1. In a lifting truck of the character described, a wheeled base, an elevating platform, and means for raising said platform including solid resilient mechanism adapted to permit the platform to move relatively to said base, said resilient mechanism being connected between the base and platform.

2. In a lifting truck of the character described, a wheeled base, an elevating platform, and means for raising said platform including resilient mechanism connected to the platform and adapted to permit the platform to move relatively to said base, said raising means also including links pivotally connected to the base and to said resilient mechanism.

3. In a lifting truck of the character described, a wheeled base, an elevating platform, and means for raising said platform including springs connected to the latter and to the base and adapted to permit the platform to move relatively to said base.

4. In a lifting truck of the character described, a wheeled base, an elevating platform, and means for raising said platform including links pivotally connected to said base and springs connected to said links and to the platform, said springs being adapted to permit the platform to move relatively to said base, while the platform is in raised position.

5. A lifting truck including a wheeled base, links pivotally connected to said base, an elevating platform pivotally connected to certain of said links, and springs connected to said platform and to the other links.

6. A lifting truck including a movable base, an elevating platform, rigid connecting members pivotally connected to the base, and springs connected to said platform and to the connecting members.

7. A lifting truck including a movable base, links pivotally connected to said base, leaf springs having certain of their ends connected to said links, and an elevating platform connected to the other ends of said springs.

8. A lifting truck including a wheeled base, front and rear links having their lower ends pivotally connected to said base, an elevating platform pivotally connected to the upper ends of said front links, leaf springs having their front ends connected to said platform and their rear ends connected to said rear links, and members carried by the platform and resting on the springs.

In testimony whereof, I affix my signature at Cincinnati, Ohio, this 16th day of December, 1919.

WILLIAM STUEBING, Jr.